(12) United States Patent
Duong et al.

(10) Patent No.: US 11,499,475 B2
(45) Date of Patent: Nov. 15, 2022

(54) FAN ASSEMBLY HAVING FLOW RECIRCULATION CIRCUIT WITH ROTATING AIRFOILS

(71) Applicant: PRATT & WHITNEY CANADA CORP., Longueuil (CA)

(72) Inventors: Hien Duong, Mississauga (CA); Vijay Kandasamy, T. Palur (IN)

(73) Assignee: PRATT & WHITNEY CANADA CORP., Longueuil (CA)

( * ) Notice: Subject to any disclaimer, the term of this patent is extended or adjusted under 35 U.S.C. 154(b) by 923 days.

(21) Appl. No.: 16/199,071

(22) Filed: Nov. 23, 2018

(65) Prior Publication Data

US 2020/0165968 A1    May 28, 2020

(51) Int. Cl.
*F02C 3/34* (2006.01)
*F02C 7/042* (2006.01)
*F04D 29/42* (2006.01)

(52) U.S. Cl.
CPC ............... *F02C 3/34* (2013.01); *F02C 7/042* (2013.01); *F04D 29/4226* (2013.01); *F05D 2220/323* (2013.01); *F05D 2220/36* (2013.01)

(58) Field of Classification Search
CPC ............. F04D 27/009; F04D 27/0207; F04D 27/0215; F04D 27/023; F04D 27/0238; F04D 29/4226; F04D 29/522; F04D 29/68; F04D 29/682; F04D 29/684; F02C 3/34; F02C 7/04; F02C 9/18; F05D 2220/36

USPC ................................... 415/58.4, 58.5
See application file for complete search history.

(56) References Cited

U.S. PATENT DOCUMENTS

| 4,844,689 | A | 7/1989 | Seed |
| 5,431,533 | A | 7/1995 | Hobbs |
| 8,202,039 | B2* | 6/2012 | Guemmer ............ F04D 29/684 |
| | | | 415/55.5 |
| 10,066,486 | B2* | 9/2018 | Broszat ................. G06F 30/00 |
| 2016/0177833 | A1 | 6/2016 | Simon-Delgado et al. |
| 2018/0030893 | A1 | 2/2018 | Duong |

FOREIGN PATENT DOCUMENTS

GB    2038425    7/1980

* cited by examiner

*Primary Examiner* — Kenneth Bomberg
*Assistant Examiner* — Julian B Getachew
(74) *Attorney, Agent, or Firm* — Norton Rose Fulbright Canada LLP

(57) ABSTRACT

There is disclosed a fan assembly including a fan rotor including a hub and fan blades. The fan blades have a leading edge and a trailing edge. A fan stator downstream of the fan rotor relative to a direction of an airflow through the fan assembly. The fan stator includes vanes extending between radially inner ends and radially outer ends. A flow recirculation circuit has an inlet downstream of the vanes of the fan stator and an outlet upstream of the vanes. A recirculation rotor has a plurality of airfoils circumferentially distributed around the axis and located in the flow recirculation circuit. The recirculation rotor is rotatable about the axis within the recirculation circuit. A method of operating the fan assembly is also disclosed.

20 Claims, 2 Drawing Sheets

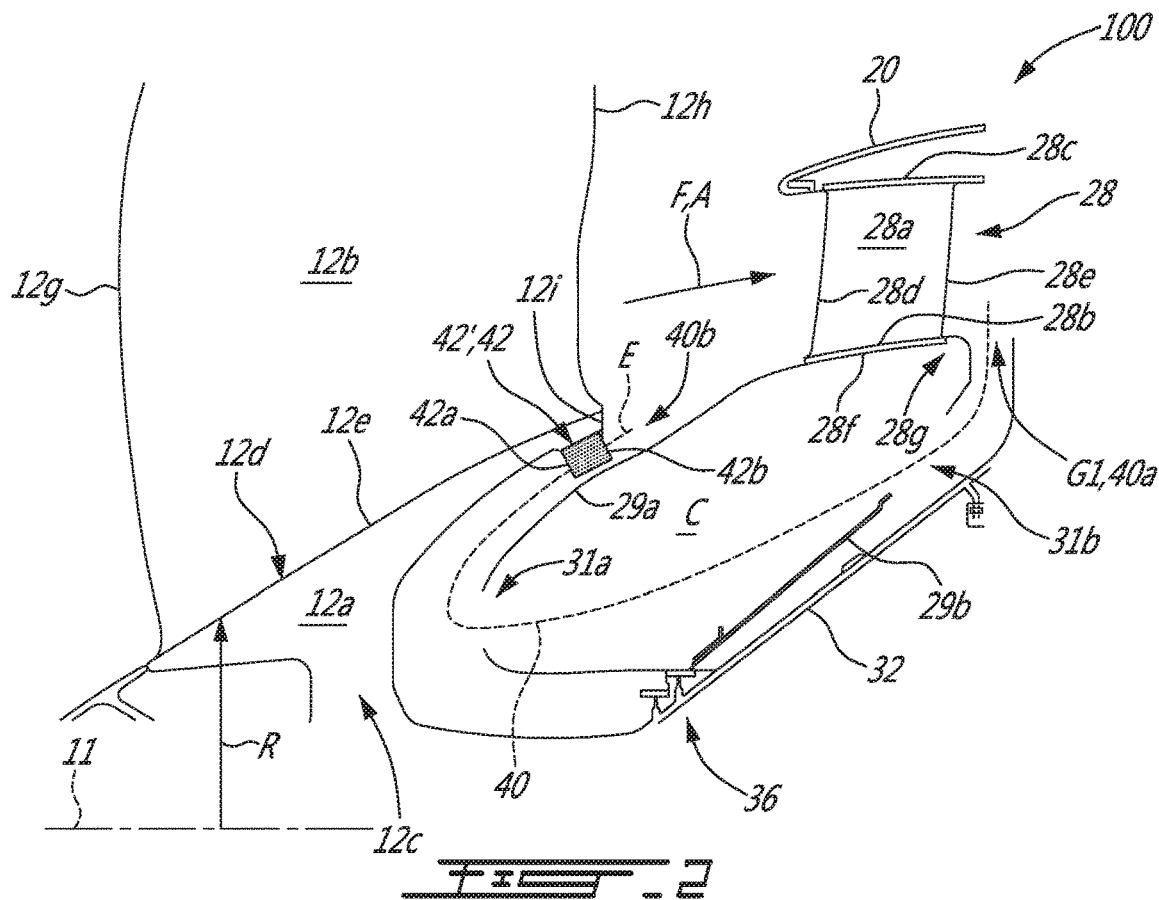
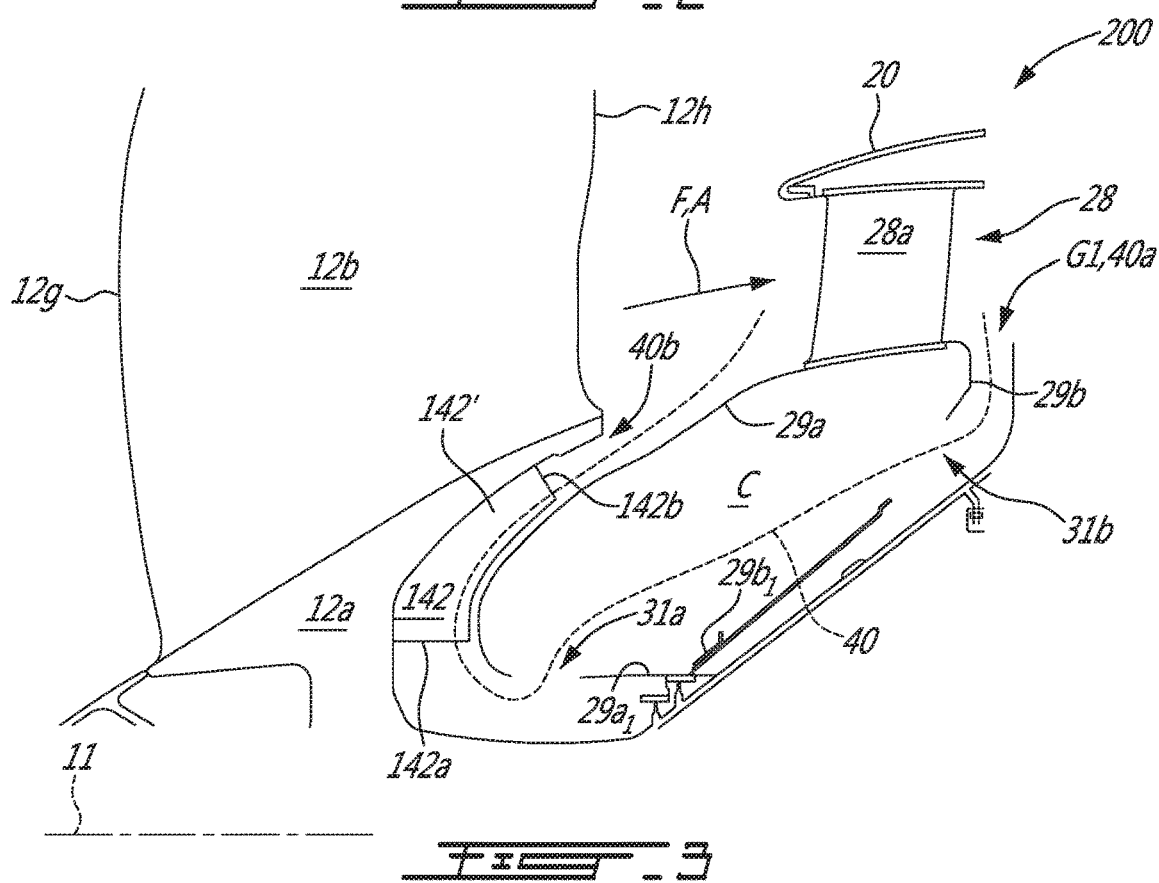

FAN ASSEMBLY HAVING FLOW RECIRCULATION CIRCUIT WITH ROTATING AIRFOILS

TECHNICAL FIELD

The application relates generally to gas turbine engines and, more particularly, to fan assemblies of turbofan gas turbine engines.

BACKGROUND OF THE ART

The fans of many turbofan gas turbine engines have fan blades that have a high slope at their radially inner ends and thus have a large change in radius from leading edges to trailing edges of the fan blades. These geometric parameters may provide certain aerodynamic advantages. However, when the chord lengths of the fan blades are minimized for reducing overall weight, or when the thicknesses of the fan blades are increased for structural reasons, the resulting high slope may compromise the flow downstream of the fan blades. Consequently, the flow downstream of the fan blades can sometimes carry large circumferential wake and thick end wall boundary layers. This might impair performance of downstream components of the gas turbine engine.

SUMMARY

In one aspect, there is provided a fan assembly for a gas turbine engine comprising: a fan rotor rotatable about an axis, the fan rotor including a hub and fan blades, the fan blades having a leading edge and a trailing edge; a fan stator downstream of the fan rotor relative to a direction of an airflow through the fan assembly, the fan stator including vanes extending between radially inner ends and radially outer ends; a flow recirculation circuit having an inlet downstream of radially inner ends of the vanes of the fan stator and an outlet upstream of radially inner ends of the vanes; and a recirculation rotor having a plurality of airfoils circumferentially distributed around the axis and located in the flow recirculation circuit between the inlet and the outlet, the recirculation rotor rotatable about the axis.

In another aspect, there is provided a turbofan gas turbine engine comprising: a fan rotor rotatable about an axis, the fan rotor including a hub and fan blades, the fan blades having a leading edge and a trailing edge; a fan stator downstream of the fan rotor relative to a direction of an airflow through the fan rotor, the fan stator including vanes extending between radially inner ends and radially outer ends; a compressor rotor downstream of the fan stator and rotatable about the axis; a flow recirculation circuit having an inlet located axially between the radially inner ends of the vanes of the fan stator and the compressor rotor, the flow recirculation circuit having an outlet located upstream of the radially-inner ends of the vanes; and a plurality of airfoils circumferentially distributed around the axis and located in the flow recirculation circuit, the airfoils rotatable about the axis within the recirculation circuit.

In yet another aspect, there is provided a method of operating a fan assembly of a gas turbine engine comprising: receiving an airflow between fan blades extending from a hub of a fan rotor of the fan assembly rotatable about an axis and between vanes of a fan stator, the fan stator located downstream of the fan rotor relative to the airflow; drawing a portion of the airflow from downstream of the fan stator proximate radially inner ends of the vanes; pushing the drawn portion of the airflow in an upstream direction relative to the airflow; and injecting the drawn portion of the airflow upstream of the fan stator and adjacent the hub.

DESCRIPTION OF THE DRAWINGS

Reference is now made to the accompanying figures in which:

FIG. 2 is a schematic cross-sectional view of a portion of the gas turbine of FIG. 1 showing a fan assembly in accordance with one embodiment; and FIG. 3 is a schematic cross-sectional view of a portion of the gas turbine of FIG. 1 showing a fan assembly in accordance with another embodiment.

DETAILED DESCRIPTION

Figure 1:
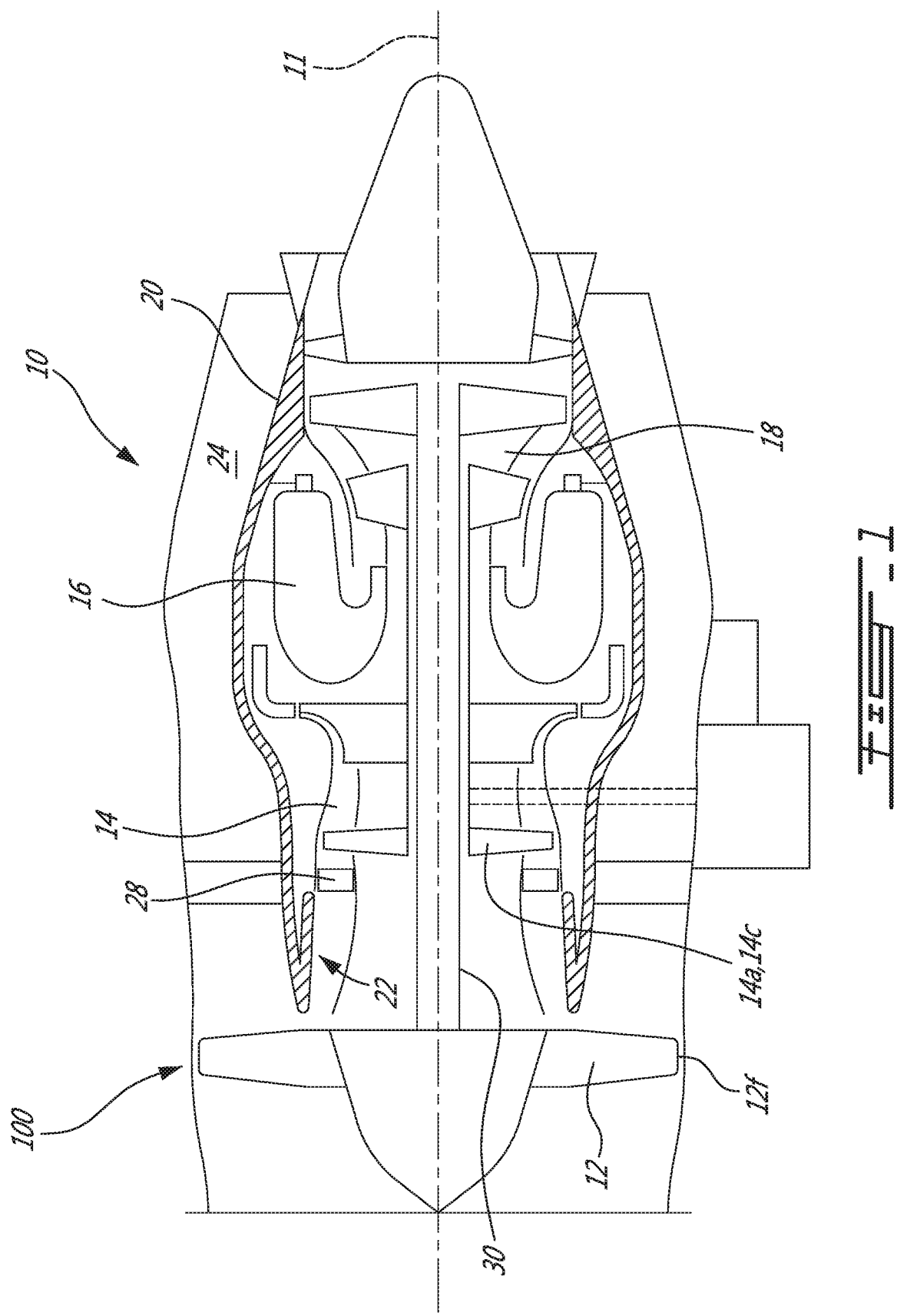
FIG. 1 is a schematic cross-sectional view of a gas turbine engine.

FIG. 1 illustrates a gas turbine engine 10 of a type preferably provided for use in subsonic flight, generally comprising in serial flow communication a fan assembly 100, which includes a fan rotor 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan rotor, the compressor section 14, and the turbine section 18 are rotatable about the axis 11.

The gas turbine engine 10 has an engine casing 20 that circumferentially extends around the axis 11. The gas turbine engine 10 defines a core flow path 22 located radially inwardly of the engine casing 20 relative to the axis 11 and a bypass flow path 24 located radially outwardly of the engine casing 20 relative to the axis 11.

Referring to FIGS. 1-2, the fan assembly 100 includes the fan rotor 12, and a fan core stator (or simply "fan stator") 28 which is located within the engine core downstream of the fan rotor 12, relative to a direction of an airflow F circulating in the gas turbine engine 10. The direction of the airflow F is denoted by arrow A. The fan rotor 12 and the fan stator 28 are described one by one herein after.

The fan rotor 12 includes a hub 12a and fan blades 12b protruding radially outwardly from the hub 12a relative to the axis 11. The hub 12a is securable to a shaft 30 (FIG. 1) of the gas turbine engine 10 for integral rotation therewith. In the depicted embodiment, the hub 12a includes a disk 12c; the disk 12c defining a platform 12d from which the fan blades 12b protrude. The disk 12c may be secured to the shaft 30 of the gas turbine engine 10 for integral rotation therewith.

The fan blades 12b have radially inner ends 12e secured to the hub 12a and radially outer ends 12f (FIG. 1) that may be unsupported, or free. The fan blades 12b have leading edges 12g and trailing edges 12h downstream of the leading edges 12g relative to the direction of the airflow F, and pressure and suction sides extending from the leading edges 12g to the trailing edges 12h and from the radially inner ends 12e to the radially outer ends 12f on both sides of the fan blades 12b. The fan blades 12b extend through both of the core flow path 22 and the bypass flow path 24.

The platform 12d defines a wall that circumferentially extends all around the axis 11 to prevent the airflow F from flowing radially inwardly to the radially inner ends 12e of the fan blades 12b toward the axis 11. Stated otherwise, the wall defined by the platform 12d limits the airflow F from leaving the core flow path 22.

The fan stator 28 includes vanes 28a that extend between radially inner ends 28b and radially outer ends 28c. In the depicted embodiment, the vanes 28a are secured to the engine casing 20 at their radially outer ends 28c. Other configurations are contemplated without departing from the scope of the present disclosure. The vanes 28 have leading edges 28d and trailing edges 28e downstream of the leading edges 28d relative to the direction of the airflow F, and pressure and suction sides extending from the leading edges 28d to the trailing edges 28e and from the radially inner ends 28b to the radially outer ends 28c and on both sides of the vanes 28a. In the embodiment shown, the vanes 28a extend solely through the core flow path 22.

In the depicted embodiment, the vanes 28a protrude radially outwardly from a stationary stator platform 28f. The assembly 100 further includes an upstream stationary wall 29a extending from the stator platform 28f in an upstream direction relative to the airflow F, and a downstream stationary wall 29b extending from the stator platform 28b in a downstream direction relative to the airflow F. Both of the upstream and the downstream stationary walls 29a, 29b extend circumferentially all around the axis 11 of the gas turbine engine 10 and are, as the platform 28f, non-rotating relative to the axis 11. As illustrated in FIG. 2, the upstream and downstream stationary walls 29a, 29b meet at distal ends $29a_1$, $29b_1$ thereof relative to a distance from the stator platform 28f to enclose an annular cavity C. The annular cavity C may circumferentially extend all around the axis 11. As illustrated in FIG. 2, the annular cavity C is located radially inwardly of the hub 12a and of the vanes 28a. The upstream and downstream stationary walls 29a, 29b include each a series of apertures 31a, 31b.

The fan stator 28 is located upstream of a core compressor rotor 14a (FIG. 1) of the compressor section 14 relative to the direction of the airflow F. The compressor rotor 14a may rotate integrally with a shaft of the gas turbine engine 10 and may rotate integrally with the fan rotor 12. In the embodiment shown, a gap G1 is defined between the platform 28f of the fan stator 28 and the compressor rotor 14a (FIG. 1). More specifically, the gap G1 is located between the platform 28f of the fan stator 28 and a platform of the compressor rotor 14a from which compressor blades 14c (FIG. 1) protrude. The gap G1 allows the compressor rotor 14a and the fan stator 28 to rotate one relative to the other. Moreover, the gap G1 allows air circulating downstream of the stator vanes 28a to flow radially inwardly relative to the axis 11 to allow the recirculation of a portion of the flow F as will be described herein below.

As illustrated, a rotating wall 32 is secured to the hub 12a for integral rotation therewith. The rotating wall 32 may alternatively be secured to the shaft 30. The hub 12a of the fan rotor 12, the rotating wall 32, and the compressor rotor 14a may be monolithic. As illustrated, a sealing engagement 36 is provided at the distal ends $29a_1$, $29b_1$ of the upstream and downstream stationary walls 29a, 29b and the rotating wall 32. Any suitable seal known in the art may be used to provide the aforementioned sealing engagement 36. The sealing engagement 36 is used for limiting an airflow circulating radially between the upstream and downstream stationary walls 29a, 29b and the rotating wall 32. In a particular embodiment, the downstream stationary wall 29b and the sealing engagement 36 are omitted.

As illustrated, a radius R of the platform 12d of the hub 12a increases rapidly from the leading edges 12g to the trailing edges 12h of the fan blades 12b. It has been observed that such a large change in radius may have many benefits, such as, keeping the fan W/A low (where W is mass flow and A is area), reducing the fan $\Delta H/U^2$ (where $\Delta H$ is rotor work and U is rotational speed of the rotor), increasing the wheel speed of the low pressure (LP) compressor, and so on.

However, it has been observed that when chords of the fan blades 12b are minimized to reduce engine weight and/or length, and/or when thicknesses of the fan blades 12b are increased near their radially inner ends 12e for structural reason, the high rate of change of the radius R of the platform 12d of the hub 12a along the axis 11, and/or insufficient length of the platforms 28f, might compromise the airflow F in the vicinity of the hub 12a.

Indeed, at a rotational speed corresponding to about 80-90% of a design rotational speed of the fan rotor 12, the airflow F may carry large circumferential wake and thick end wall boundary layer. This might lead to an additional 10 degrees of positive incidence at the leading edges 28d of the vanes 28a of the fan stator 28. This end wall boundary layer might initiate premature stall on the fan stator 28 due to lower momentum, increase incidence of the vanes 28a of the fan stator 28, and increase in secondary flow. The above discussed effects might be compounded as the airflow F travels downstream and might negatively impair performance of downstream components (e.g., compressor section 14) of the gas turbine engine 10.

In the depicted embodiment, a flow recirculation circuit 40 is provided. The flow recirculation circuit as used herein is understood to be an airflow path, which may be composed of one or more interconnected passages, plenums, cavities, pipes, and/or conduits, and the like, or any combination of these as may be suitable to establish the airflow path for the recirculation air. The "circuit" 40 for flow recirculation may be an open circuit or a closed circuit. A flow path between parts, for example, may form all or part of the flow recirculation circuit 40, as can a fully enclosed air conduit. As illustrated, the flow recirculation circuit 40 encompasses the annular cavity C. The flow recirculation circuit 40 has an inlet 40a located downstream of the vanes 28a of the fan stator 28 and adjacent the radially inner ends 28b of the vanes 28a and has an outlet 40b defined between the upstream stationary wall and the rotor platform. In the embodiment shown, the outlet 40b of the flow recirculation circuit 40 is located downstream of the leading edges 12g of the fan blades 12b. As shown in FIG. 2, the flow recirculation circuit 40 extends through both of the series of apertures 31a, 31b defined through the upstream and downstream stationary walls 29a, 29b and through the annular cavity C. In other words, the inlet 40a of the flow recirculation circuit 40 is fluidly connected to the outlet 40b thereof via both of the series of apertures 31a, 31b defined through the upstream and downstream stationary walls 29a, 29b and via the annular cavity C.

In the depicted embodiment, the outlet 40b of the flow recirculation circuit 40 is an annular slot shown as a radial gap extending all around the axis 11. Other configurations are contemplated. The outlet 40b of the flow recirculation conduit 40 has an exit flow axis E being substantially parallel to the flow circulating in the core flow path 22. This might allow to avoid mixing loss when the recirculated flow is mixed with the fan core flow 22.

As illustrated in FIG. 2, the inlet 40a of the flow recirculation circuit 40 corresponds to the gap G1, which is an axial gap defined between the fan stator 28 and the compressor rotor 14a, more specifically between their respective platforms. Therefore, the inlet 40a of the flow recirculation circuit 40 is located downstream of the vanes 28a of the fan stator 28 and upstream of the compressor rotor 14a.

In a particular embodiment, it might be advantageous to accelerate the flow of air circulating within the flow recirculation circuit 40 before re-injecting said flow in the core flow path 22. In the depicted embodiment, the assembly 100 further includes a recirculation rotor 42' including a plurality of airfoils 42 that may be secured to the hub 12a of the rotor 12 and circumferentially distributed all around the axis 11. The airfoils 42 are configured for pushing the airflow out of the circuit 40 while increasing its speed and may act as a compressor rotor. The recirculation rotor 42', and the airfoils 42, may rotate integrally with the fan rotor 12. In the depicted embodiment, the airfoils 42 are located at a rearmost location of the hub 12a of the fan rotor 12. In a particular embodiment, a speed of the flow circulating in the conduit 40 decreases via its passage in the conduit 40. Hence, locating the recirculation rotor closer to the outlet 40b than the inlet 40a might incur less loss than a configuration in which the recirculation rotor is located closer to the inlet 40a than the outlet 40b.

The airfoils 42 have leading and trailing edges 42a, 42b as well as pressure and suction sides, which are on opposites sides of the airfoils. In the embodiment shown in FIG. 2, the trailing edges 42b of the airfoils 42 are located proximate a downstream end 12i of the hub 12. Other configurations are contemplated without departing from the scope of the present disclosure.

The airfoils 42 have an angle of attack with respect to the axis 11. In a particular embodiment, the angle of attack, also referred to as the staggered angle, ranges from 15 to 25 degrees. In a particular embodiment, a chord length of the airfoils ranges from 10% to 25% of that of the blades 12b of the fan rotor 12. In a particular embodiment, a number of the airfoils corresponds to that of the blades of the rotor. In a particular embodiment, each of the airfoils is circumferentially aligned with a respective one of the blades of the rotor. In the embodiment shown, the number of the airfoils 42 is more than that of the fan blades 12b of the fan rotor. The number of the airfoils may be from 2 to 4 times that of the fan blades. The number of rotor blades may be chosen to achieve a target pressure rise near the wall. However, if the number of fan blades corresponds to that of the airfoils and if they are circumferentially aligned with each other, they could be beneficial for the downstream fan core stator as the latter might see the same number of wakes. It might be beneficial to both the performance and to the dynamic response of the fan core stator. Wake mixing losses might be reduced by having the same number of airfoils than that of fan blades.

Referring now to FIG. 3, another embodiment of a fan assembly is generally shown at 200. For the sake of conciseness, only elements that differ from the fan assembly 100 described with reference to FIG. 2 are described herein below.

The fan assembly, as for the fan assembly 100 of FIG. 2, includes a a recirculation rotor 142' including a plurality of airfoils 142. In the depicted embodiment, the airfoils 142 are similar to blades of an impeller of a centrifugal compressor. More specifically, the leading edges 142a of the airfoils 142 are circumferentially offset form the trailing edges 142b relative to the axis 11. In other words, the airfoils 142 extends circumferentially along a portion of the circumference of the hub 12a of the rotor 12. Again in other words, each of the airfoils 142 may warp around a portion of a circumference of the hub 12a. A distance along a circumferential direction relative to the axis 11 between two adjacent ones of the airfoils 142 may decrease from the leading edges 142a to the trailing edges 142b. In the embodiment shown, the trailing edges 142b of the airfoils are upstream of the trailing edges 12h of the fan blades 12b. In a particular embodiment, the added mass on a rear side of the fan disk might help to reducing some of the overhung effects at the tips of the fan blades due to leading sweep.

In a particular embodiment, drawing air from the core flow path 22 downstream of the vanes 28a of the fan stator 28 and reinjecting at an upstream location by increasing its pressure with the airfoils 42, 142 allows to re-energize the flow at roots of the fan blades 12b and to reduce a thickness of boundary layer at the leading edges 28d of the vanes 28a of the fan stator 28. This might allow to reduce losses and increase resistance to flow separation even with higher incidence compared to a configuration lacking the airfoils 42, 142 and the flow recirculation circuit 40. This might allow for reducing secondary flow and might eliminate radial flow on the suction sides of the vanes 28a of the fan stator 28 to reduce overall mixing losses. In a particular embodiment, from 1% to 3% of the fan core flow is reinjected via the flow recirculation circuit 40. Recirculating the flow with the rotating airfoils 42, 142 as described herein might allow to improve performance of downstream components of the gas turbine engine 10.

In a particular embodiment, the airfoils 42, 142 located under the rotor platform 12d increase pressure near wall, filling up end wall boundary flow with high momentum flow and thus provides more favorable flow conditions into fan core stator. This might result in stator stall range improvement at part speeds and lower loss at cruise. Improving fan exit condition through flow recirculation might be expected to benefit all subsequent downstream components of the engine.

For operating the fan assembly 100, 200, the airflow F is received between the fan blades 12b and between the vanes 28a of the fan stator 28. A portion of the airflow F is drawn from downstream of the fan stator 28 proximate the radially inner ends 28b of the vanes 28a. The drawn portion of the airflow F is pushed in the upstream direction relative to the airflow F. The drawn portion of the airflow F is injected upstream of the fan stator 28 and adjacent the hub 12a.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A fan assembly for a gas turbine engine comprising:
a fan rotor rotatable about an axis, the fan rotor including a hub and fan blades, the fan blades having a leading edge and a trailing edge;
a fan stator downstream of the fan rotor relative to a direction of an airflow through the fan assembly, the fan stator including vanes extending between radially inner ends and radially outer ends;
a flow recirculation circuit having an inlet downstream of the radially inner ends of the vanes of the fan stator and an outlet upstream of the radially inner ends of the vanes; and
a recirculation rotor having a plurality of airfoils protruding radially inwardly from the hub toward the axis, the plurality of airfoils circumferentially distributed around the axis and located in the flow recirculation circuit between the inlet and the outlet, the recirculation rotor rotatable about the axis.

2. The fan assembly of claim 1, wherein the flow recirculation circuit extends through an annular cavity that circumferentially extends around the axis, the annular cavity located radially inwardly of the hub and of the vanes.

3. The fan assembly of claim 2, wherein the fan stator incudes an upstream stationary wall and a downstream stationary wall, the upstream and downstream stationary walls circumscribing the annular cavity.

4. The fan assembly of claim 3, wherein each of the upstream and downstream stationary walls defines a series of apertures circumferentially distributed around the axis, the inlet of the flow recirculation circuit fluidly connected to the outlet thereof via both of the series of apertures of the upstream and downstream stationary walls.

5. The fan assembly of claim 1, wherein a number of the airfoils corresponds to that of the fan blades.

6. The fan assembly of claim 1, wherein chord lengths of the airfoils range from 10% to 25% of that of the fan blades, and/or wherein angles of attack of the airfoils relative to the axis range from 15 to 25 degrees.

7. The fan assembly of claim 1, wherein the airfoils have leading edges and trailing edges, the trailing edges circumferentially offset from the leading edges relative to the axis such that each of the airfoils wraps around a portion of a circumference of the hub.

8. The fan assembly of claim 1, wherein trailing edges of the airfoils are located upstream of a downstream end of the hub.

9. A turbofan gas turbine engine comprising:
a fan rotor rotatable about an axis, the fan rotor including a hub and fan blades, the fan blades having a leading edge and a trailing edge;
a fan stator downstream of the fan rotor relative to a direction of an airflow through the fan rotor, the fan stator including vanes extending between radially inner ends and radially outer ends;
a compressor rotor downstream of the fan stator and rotatable about the axis;
a flow recirculation circuit having an inlet located axially between the radially inner ends of the vanes of the fan stator and the compressor rotor, the flow recirculation circuit having an outlet located upstream of the radially-inner ends of the vanes; and
a plurality of airfoils circumferentially distributed around the axis and located in the flow recirculation circuit, the airfoils rotatable about the axis within the recirculation circuit, the plurality of airfoils protruding radially inwardly from the hub toward the axis.

10. The turbofan gas turbine engine of claim 9, wherein the flow recirculation circuit extends through an annular cavity that circumferentially extends around the axis, the annular cavity located radially inwardly of the hub and of the radially inner ends of the vanes.

11. The turbofan gas turbine engine of claim 10, wherein the fan stator incudes an upstream stationary wall and a downstream stationary wall, the upstream and downstream stationary walls circumscribing the annular cavity.

12. The turbofan gas turbine engine of claim 11, wherein each of the upstream and downstream stationary walls defines a series of apertures circumferentially distributed around the axis, the inlet of the flow recirculation circuit fluidly connected to the outlet thereof via both of the series of apertures of the upstream and downstream stationary walls.

13. The turbofan gas turbine engine of claim 9, wherein chord lengths of the airfoils range from 10% to 25% of that of the fan blades.

14. The turbofan gas turbine engine of claim 9, wherein the airfoils have leading edges and trailing edges, the trailing edges circumferentially offset from the leading edges relative to the axis such that each of the airfoils wraps around a portion of a circumference of the hub.

15. The turbofan gas turbine engine of claim 9, wherein trailing edges of the airfoils are located upstream of a downstream end of the hub.

16. The turbofan gas turbine engine of claim 9, wherein angles of attack of the airfoils relative to a flow of air circulating in the flow recirculation circuit range from 15 to 25 degrees.

17. The turbofan gas turbine engine of claim 9, wherein the airfoils are secured to the hub for integral rotation therewith.

18. The turbofan gas turbine engine of claim 9, wherein the plurality of airfoils are located axially forward of leading edges of the vanes of the fan stator.

19. A method of operating a fan assembly of a gas turbine engine comprising:
receiving an airflow between fan blades extending from a hub of a fan rotor of the fan assembly rotatable about an axis and between vanes of a fan stator, the fan stator located downstream of the fan rotor relative to the airflow;
drawing a portion of the airflow from downstream of the fan stator proximate radially inner ends of the vanes;
pushing the drawn portion of the airflow in an upstream direction relative to the airflow with airfoils rotating with the fan rotor about the axis, the airfoils are protruding radially inwardly from the hub toward the axis; and
injecting the drawn portion of the airflow upstream of the fan stator and adjacent the hub.

20. The method of claim 19, wherein the pushing of the drawn portion of the airflow includes pushing the drawn portion of the airflow with the plurality of airfoils being located axially forward of leading edges of the vanes of the fan stator.

* * * * *